No. 684,642. Patented Oct. 15, 1901.
C. S. KAUFMANN.
PLATE FOR STORAGE BATTERIES.
(Application filed Jan. 9, 1901.)
(No Model.)
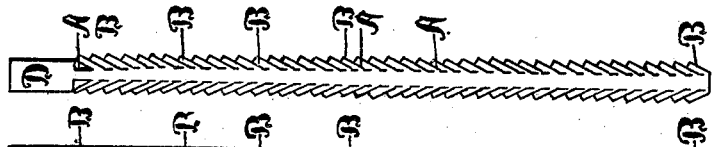
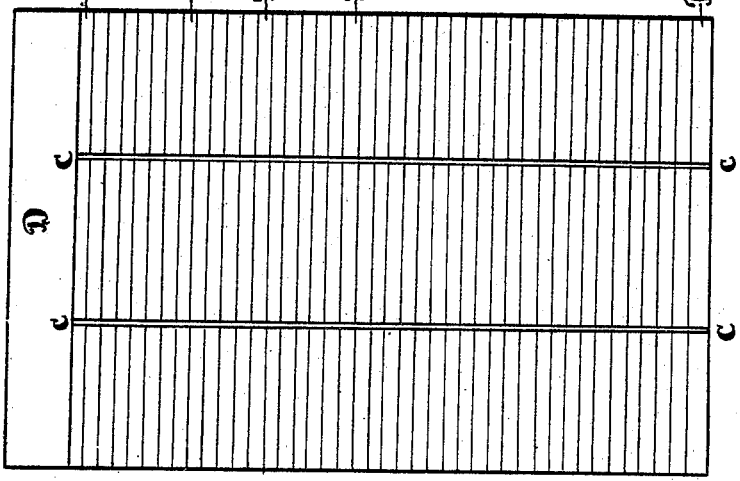
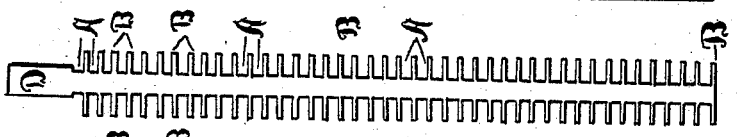
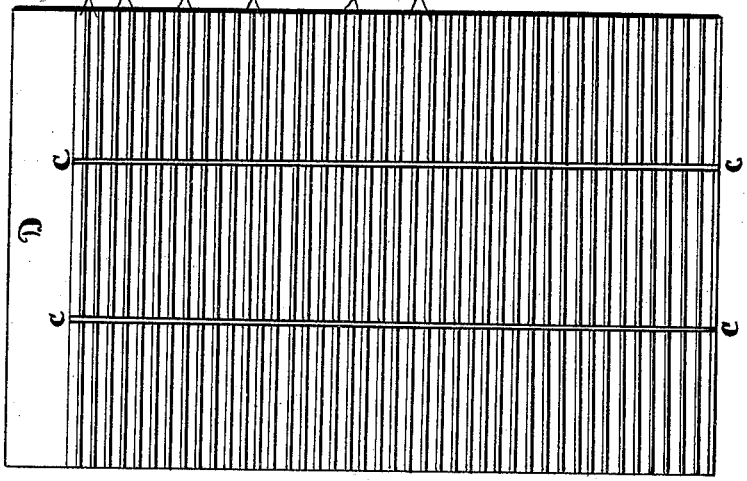
Witnesses.
Samuel W. Banning.
Thomas B. McGregor.
Inventor.
Charles S. Kaufmann
By. Banning & Banning
Attys.

UNITED STATES PATENT OFFICE.

CHARLES S. KAUFMANN, OF CHICAGO, ILLINOIS, ASSIGNOR TO THE AMERICAN BATTERY COMPANY, OF CHICAGO, ILLINOIS.

PLATE FOR STORAGE BATTERIES.

SPECIFICATION forming part of Letters Patent No. 684,642, dated October 15, 1901.

Application filed January 9, 1901. Serial No. 42,595. (No model.)

*To all whom it may concern:*

Be it known that I, CHARLES S. KAUFMANN, a citizen of the United States, residing at Chicago, Cook county, Illinois, have invented certain new and useful Improvements in Plates for Storage Batteries, of which the following is a specification.

Heretofore it has been difficult to make a storage-battery plate which was simple and inexpensive and at the same time free from liability to warping or buckling when the cell of which it is a part is subjected to strains in charging and discharging at comparatively high rates of current.

The object of my invention is to make a plate which will overcome this difficulty and at the same time present as large an amount of surface upon which the electrochemical action may take place as possible.

I take a plate of lead of the desired thickness and subject it to a chiseling, gouging, or milling operation, thus making a series of grooves or channels and of projecting leaves or ridges at right angles to the plane of the plate. It is easier to cut the grooves or channels which form the leaves or ridges at right angles to the body of the plate and afterward press the leaves to any desired angle than to cut them at an angle oblique to the plane of the plate. I then take the plate with its leaves thus standing at right angles and subject it to a pressing or rolling operation, so that the leaves are pressed down flat upon one another and so that their edges overlap, causing the outer or free edge of one leaf to rest upon the next adjacent leaf.

In the drawings, Figure 1 is a side elevation showing a plate after it has been subjected to the gouging, chiseling, or milling operation and while the leaves are in a position at right angles to the plane of the plate. Fig. 2 is an end view of the plate, showing its condition before the leaves have been rolled or flattened down upon one another. Fig. 3 is a side elevation of my invention after the plate has been subjected to the rolling or pressing operation; and Fig. 4 is an end view of the plate, showing its condition after the leaves have been rolled down upon one another.

A represents the series of grooves or channels; B, the series of leaves; C, channels running at right angles to the leaves, dividing them into blocks or sections, and D a head or portion of the plate preserved solid for the purpose of attaching it to a frame or other desired support. I then take the plate after the leaves have been rolled or flattened down upon each other, as shown in Figs. 3 and 4, and immerse it in a suitable chemical solution and subject it to the action of a current of electricity while so immersed to cause a deposit of peroxid of lead upon and between the leaves of the plate. As soon as the peroxid of lead begins to form and the chemical solution to enter between the leaves the peroxid of lead gradually lifts or presses the leaves apart, thus presenting a new portion of surface to the action of the solution, while at the same time the peroxid of lead formed and forming is held securely and tightly between the leaves. This compression of the peroxid of lead between the leaves tends to prevent it from being jarred or shaken out of place after the plate has been formed and put to use. The formation of the peroxid of lead in the chemical solution is continued until the leaves have been pressed apart a desired distance, but not enough to bring them to the right-angle position in which they were originally made. It will thus be seen that the peroxid of lead is held in place by the pressure of the leaves of the plate and that the space between the leaves which it occupies is formed or created by the action of the peroxid of lead itself while it is being formed and without the addition of other means. By dividing the leaves into sections or blocks through means of channels or slots running at right angles to them the liability of the plate warping or buckling is greatly obviated, as the leaves of each section or block may grow or expand without affecting the leaves of the other blocks or sections. Each block or section of leaves becomes in effect a separate plate of dimensions bounded by its ends and the grooves or slots along its sides.

What I regard as new, and desire to secure by Letters Patent, is—

1. An element or plate for an electric storage battery consisting of a body provided with transverse leaves having their bases separated from one another and having the free edge of each leaf, except the upper one, bent down flat upon the next adjoining upper leaf preparatory to receiving the active material, substantially as described.

2. An element or plate for an electric storage battery consisting of a body provided with leaves cut at right angles thereto having their bases separated from one another and having the free edge of each leaf, except the upper one, bent down flat upon the next adjoining upper leaf preparatory to receiving the active material, and provided with grooves or slots dividing the leaves into blocks or groups, substantially as described.

3. An element or plate for an electric storage battery consisting of a body provided with leaves cut at right angles thereto having their bases separated from one another and having the free edge of each leaf, except the upper one, bent down flat upon the next adjoining upper leaf and active material deposited between the leaves, substantially as described.

CHAS. S. KAUFMANN.

Witnesses:
SAMUEL W. BANNING,
THOMAS B. MCGREGOR.